Figure 1:
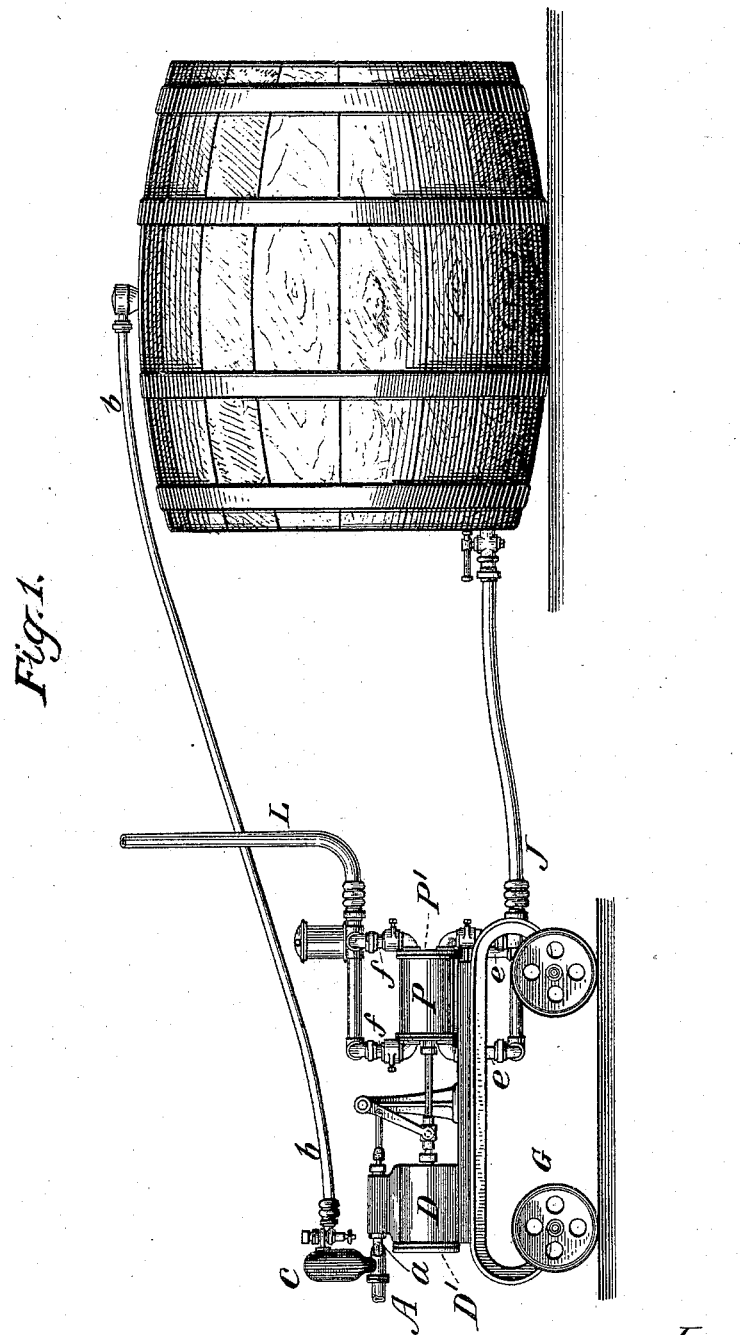

(No Model.)

2 Sheets—Sheet 1.

C. KAISER.
PROCESS OF DRAWING OFF BEER.

No. 540,167.

Patented May 28, 1895.

Witnesses:-

Inventor:
Christian Kaiser
By Clarence L. Burger
Attorney (No Model.) 2 Sheets—Sheet 2.

C. KAISER.
PROCESS OF DRAWING OFF BEER.

No. 540,167. Patented May 28, 1895.

Witnesses:

Inventor:

UNITED STATES PATENT OFFICE.

CHRISTIAN KAISER, OF NUREMBERG, GERMANY.

PROCESS OF DRAWING OFF BEER.

SPECIFICATION forming part of Letters Patent No. 540,167, dated May 28, 1895.

Application filed February 19, 1894. Serial No. 500,641. (No model.)

*To all whom it may concern:*

Be it known that I, CHRISTIAN KAISER, manufacturer, a subject of the German Emperor, residing at Nuremberg, in the Kingdom of Bavaria, in the Empire of Germany, have invented certain new and useful Improvements in Processes of Drawing Off Beer, of which the following is a specification.

For drawing off beer from storage casks, compressed air has, as is well known, been found to be a peculiarly suitable source of power, whether such be employed in the cask itself or in special drawing-off apparatus directly on the surface of the liquid which is to be drawn up. While, however, the first named process is not unattended with danger in view of the great strain on the storage casks, the apparatus mentioned in the second place is mostly defective as regards desired certainty of action. The use of the ordinary pump mechanism for the above named purpose also cannot be recommended on account of the difficulties connected with its mechanical action in deep cellars, and of the great agitation to which the beer is exposed in the process of pumping up.

This invention has for its object the drawing off of beer by means of a process which, while it permits of the use of compressed air as the source of power, allows of an action being attained as reliable as that of a good pump mechanism. Further, no deleterious movement causing a loss of carbonic acid is caused in the beer during the drawing off. In order to attain this object, the drawing off is carried out in such a way that, on the one hand, the compressed air acts with a moderate pressure on the surface of the beer contained in the storage cask, and forces the beer gently out, and, on the other hand, is utilized, but at a high pressure, for driving a pump which receives the beer flowing out of the cask and conveys it upward. By this process, the beer, owing to the pressure exerted thereon is always discharged from the cask at a certain speed, approximately corresponding to that of the piston, the violent rush of the liquid into the pump cylinder, visible when liquids are drawn up, is avoided, and, instead, a quiet regular flow takes place, free from spurts. The pump mechanism is in fact so arranged that, even on a change of stroke, no spurts result, and the supply and delivery of the beer take place continuously and without the formation of froth.

The apparatus employed for carrying out the process hereinbefore described is of the construction hereinafter described and shown on the accompanying drawings, in which—

Figure 2:
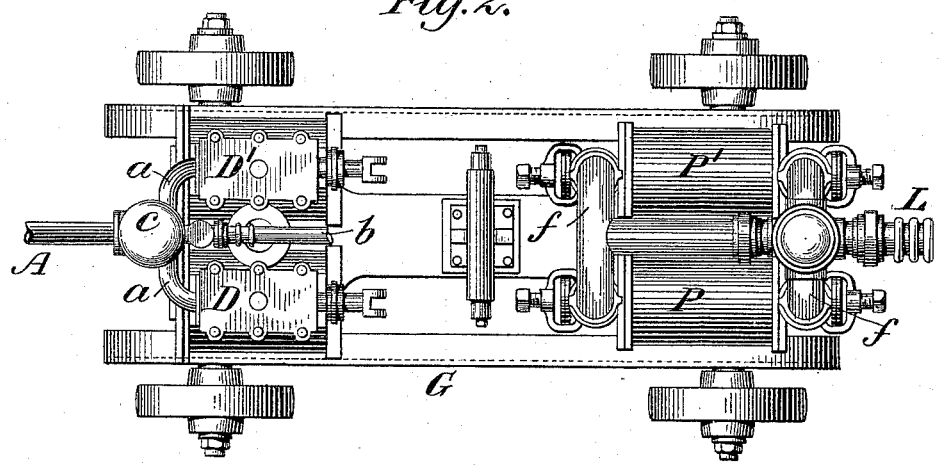
Figure 3:
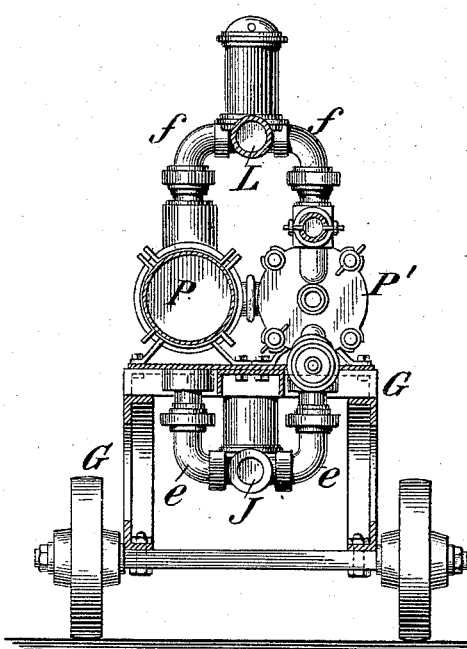

Figure 1 is a side elevation partly in section; Fig. 2, an end elevation; Fig. 3, a plan.

An air pressure pipe A, arranged in the cellar, has two branches, one of which, $a$, leads to the pump, the other, $b$, to the storage cask, and enters the latter at the top. In the branch $b$, an air chamber $c$ and a reducing valve are inserted, by means of which an even pressure action is obtained, and the pressure in the storage cask is maintained at a given height which suffices for the object desired.

The pump is arranged as a so called duplex pump, and consists of two double acting pump cylinders P and P', which are directly connected by means of the piston rods with the air pressure cylinders D and D' connected with the tube $a$.

The four suction valves of both pump cylinders are connected by means of short pipes $e$ with a common supply pipe J, and the four pressure valves, by means of short pipes $f$, with a common pressure pipe L. The pipe J leads to the storage cask which is to be drawn from, while the beer drawn off is forced upward by means of the pipe L. The whole pump mechanism is mounted on a movable stand G.

By means of the hereinbefore described arrangement of the pump, as against the periodical mode of working of the ordinary drawing-off apparatus working by means of compressed air, hitherto employed, a continuous supply and a similar farther conveyance of the beer is rendered possible. As, however, as already stated, the entrance of the beer into the pump takes place as nearly as possible without any shock, the drawing off may be effected proportionately more quickly and without the formation of deleterious froth. The use of this improved process has also the advantage of producing an effective ventilation of the cellar by means of the cold air discharged.

I declare that what I claim is—

1. The process for drawing-off beer with compressed air as the motive force which consists in conducting compressed air from a source of supply through a pressure-reducing valve into the storage cask from which the beer is to be drawn, and simultaneously conducting compressed air from the same source of supply, but at high pressure, into a pump driven thereby, and connected with the storage cask so as to receive the beer forced out of the said cask and continuously convey it to the desired elevation.

2. Apparatus for drawing-off beer, consisting of a compressed air supply pipe A, a branch pipe $b$ leading therefrom into the storage cask, an air chamber $c$ and a pressure-reducing valve in the branch pipe $b$, a compressed air-driven pump connected with the storage cask and a branch compressed air pipe $a$ leading to the air cylinders of said pump.

In testimony whereof I have signed my name to this specification in the presence of two subscribing witnesses.

CHRISTIAN KAISER.

Witnesses:
ANDREAS STICY,
OSCAR BOCK.